United States Patent
Bulin et al.

(10) Patent No.: US 8,684,299 B2
(45) Date of Patent: Apr. 1, 2014

(54) ANCILLARY DEVICE WITH AN AIR TURBINE FOR TAXIING AN AIRCRAFT ON THE GROUND

(75) Inventors: Guillaume Bulin, Blagnac (FR); Christophe Cros, L'Union (FR); Juluan Gaultier, Bouc Bel Air (FR)

(73) Assignee: Airbus Operations (S.A.S), Toulouse (FR)

( * ) Notice: Subject to any disclaimer, the term of this patent is extended or adjusted under 35 U.S.C. 154(b) by 358 days.

(21) Appl. No.: 12/990,145

(22) PCT Filed: May 4, 2009

(86) PCT No.: PCT/FR2009/050810
§ 371 (c)(1),
(2), (4) Date: Mar. 21, 2011

(87) PCT Pub. No.: WO2009/141550
PCT Pub. Date: Nov. 26, 2009

(65) Prior Publication Data
US 2011/0155846 A1    Jun. 30, 2011

(30) Foreign Application Priority Data
May 5, 2008    (FR) ...................................... 08 52982

(51) Int. Cl.
*B64C 25/50* (2006.01)
(52) U.S. Cl.
USPC .... 244/50; 244/100 R; 244/102 R; 244/103 S
(58) Field of Classification Search
USPC .......................... 244/50, 100 R, 102 R, 103 S
See application file for complete search history.

(56) References Cited

U.S. PATENT DOCUMENTS

| 2,869,662 | A | * | 1/1959 | Koup | 180/55 |
| 2,911,168 | A | * | 11/1959 | Moreland | 244/50 |
| 3,034,748 | A | * | 5/1962 | Koup | 244/50 |
| 3,211,400 | A | * | 10/1965 | Booth | 244/50 |
| 3,344,879 | A | * | 10/1967 | Glomb et al. | 180/55 |
| 3,446,459 | A | * | 5/1969 | Reese et al. | 244/50 |
| 3,469,646 | A | * | 9/1969 | O'Connor | 180/255 |
| 3,469,648 | A | * | 9/1969 | Cannon | 180/261 |
| 3,502,166 | A | * | 3/1970 | Livezey et al. | 180/55 |
| 3,568,958 | A | * | 3/1971 | Bhore | 244/55 |
| 3,581,682 | A | * | 6/1971 | Kontranowski | 180/55 |
| 3,762,670 | A | * | 10/1973 | Chillson | 244/50 |
| 3,807,664 | A | * | 4/1974 | Kelly et al. | 244/50 |
| 6,247,668 | B1 | * | 6/2001 | Reysa et al. | 244/58 |

(Continued)

FOREIGN PATENT DOCUMENTS

| DE | 4235815 A1 | 4/1994 |
| DE | 4339884 A1 | 7/1994 |
| GB | 603792 A | 6/1948 |

OTHER PUBLICATIONS

International Search Report with mailing date of Dec. 30, 2009.

*Primary Examiner* — Isam Alsomiri
*Assistant Examiner* — Assres H Woldemaryam
(74) *Attorney, Agent, or Firm* — Greer, Burns & Crain Ltd.

(57) ABSTRACT

Device for driving at least one wheel of an aircraft landing gear, which includes at least one turbine machine incorporated into the landing gear of the aircraft. Advantageously, the turbine machine is a pneumatic turbine.

14 Claims, 2 Drawing Sheets

(56) References Cited

U.S. PATENT DOCUMENTS

| | | | |
|---|---|---|---|
| 6,450,448 B1* | 9/2002 | Suzuki | 244/104 FP |
| 7,225,607 B2* | 6/2007 | Trumper et al. | 60/223 |
| 8,109,464 B2* | 2/2012 | Bhargava | 244/63 |
| 2005/0224642 A1* | 10/2005 | Sullivan | 244/111 |
| 2006/0042226 A1* | 3/2006 | Trumper et al. | 60/204 |
| 2008/0059053 A1* | 3/2008 | Cox et al. | 701/121 |
| 2008/0217466 A1* | 9/2008 | Bhargava | 244/50 |
| 2009/0261197 A1* | 10/2009 | Cox et al. | 244/50 |

\* cited by examiner

ANCILLARY DEVICE WITH AN AIR TURBINE FOR TAXIING AN AIRCRAFT ON THE GROUND

CROSS-REFERENCE TO RELATED APPLICATIONS

This application is the National Stage of International Application No. PCT/FR2009/050810 International Filing date, 4 May 2009, which designated the United States of America, and which International Application was published under PCT Article 21 (s) as WO Publication No. WO2009/141550 A2 and which claims priority from, and benefit of, French Application No. 0852982 filed on 5 May 2008, the disclosures of which are incorporated herein by reference in their entireties.

The aspects of the disclosed embodiments relate to an auxiliary device for taxiing an aircraft on the ground and more specifically a device consisting of an integrated system for moving an aircraft designed for towing the aircraft on the ground.

The aspects of the disclosed embodiments apply particularly to commercial airplanes fitted with turbojets.

BACKGROUND

In general, the taxiing phase of commercial aircraft is carried out by using the thrust of at least one of the airplane's main engines, and/or by towing the aircraft using a runway tractor.

Taxiing an airplane can be divided into two phases.

The first phase is the phase known in English as "taxi out", i.e. the phase in which the airplane is heading away from the passenger boarding gate towards the threshold of the runway to take off:

During this phase the airplane leaves the terminal pushed backwards by a runway tractor and one or more of its main engines are operating.

Once the airplane is sufficiently far away from the terminal and positioned to move forward, the tractor is disconnected. The airplane then moves forward at low speed, using the thrust from one or more of its main engines, from the terminal to the threshold of the take-off runway. The airplane is then controlled by the pilot from the cockpit via the flight control unit.

The second phase is the phase known in English as "taxi-in", i.e. the phase in which the airplane is heading from the landing runway to the terminal after landing:

In this phase, after landing, the airplane moves at low speed from the landing runway towards the terminal using the thrust of one or more of its main engines, under the control of the pilot in the cockpit, via the flight control unit.

When approaching the terminal, the airplane's movements may be guided by ground crew and, in case of congested traffic, the airplane may stop before the terminal and then be brought to the arrival gate by a runway tractor.

Taxiing airplanes using the current procedure is a source of significant costs for airlines.

These costs relate primarily to the use of jet engines for taxiing, since these are designed for the flight phase and therefore their operation is not optimal at low speeds and low power, resulting in over-consumption of kerosene.

The additional costs of maintenance and repair of damages caused by the jet blast when airplanes are too close to one another and by the ingestion of debris by jet engines during taxiing must also be taken into account.

Moreover, using jet engines for taxiing is also a source of noise pollution within the airport and causes emissions of polluting particles that affect local air quality and contribute to the greenhouse effect.

Furthermore, the current procedure makes the airplane dependent on runway tractors for reversing, as airplane jet engines generally do not allow backward movement.

This can lead both to delays when the tractors are not available and to costs linked to their use.

It is therefore desirable for companies to reduce their operational costs by optimizing the ground movement of airplanes. To achieve this, new taxiing procedures must be proposed to reduce kerosene consumption, shorten the duration of taxiing as well as reduce emissions of noise and polluting gases.

The solution proposed by the disclosed embodiments thus relates to an autonomous taxiing system, housed in or near the hubs or rims of the main or nose gear wheels of a commercial airplane.

SUMMARY

The device according to the disclosed embodiments is particularly designed for the nose or main landing gears of an airliner equipped with turbojets.

Technical solutions exist for autonomous taxiing of aircraft and notably, document US/2006/0065779 A1 describes a nose gear fitted with at least one wheel axle, at least one wheel coupled to the wheel axle, at least one wheel motor coupled to the wheel axle and to the wheel and a control device linked to the wheel motor causing the wheel to turn.

This document envisages an electric motor housed in the rim of at least one nose wheel as the only embodiment.

This electric motor allows the taxiing function to be performed, and also allows the nose wheels to be set in rotation prior to landing, to minimize wear on the tires at the moment when they touch the runway.

The main drawback of a nose gear system motorized with an electric motor is the use of a system far from the APU (auxiliary generator at the rear of the aircraft that, in particular, provides electrical power when the airplane is on the ground), which requires adding power wiring and therefore additional on-board weight.

In addition, the total weight of an electric propulsion system includes the motor itself, the power wiring, the power converter, the controller and possibly a clutch mechanism.

The weight of these devices is often high and the fuel consumed by the act of transporting this additional weight (snowball effect) may cancel out the fuel savings realized during taxiing.

The use of the nose gear for traction also has the disadvantage that the weight distributed onto the front axle may not be sufficient to allow the traction of the airplane by the nose gear: if the traction to be applied is greater than the maximum applicable traction, the wheel spins and the airplane cannot move forward.

Document U.S. Pat. No. 3,874,619 describes a specific hydraulic device combining both braking and propulsion systems according to which the brakes are mounted on actuators ensuring the aircraft's mobility.

Document U.S. Pat. No. 3,059,712 describes a hydraulic motor which, through a worm gear, drives a crown that is coupled to the rim of a landing gear wheel by an inflatable toric element.

The wheel is driven by the hydraulic motor after inflating the inflatable element that enables the drive.

Another embodiment described in document U.S. Pat. No. 3,711,043 is formed by a hydraulic motor mounted in the hub of at least one wheel of at least one main landing gear of the airplane. Like the previous system this type of system cannot function without installing a hydraulic distribution system, which requires a significant change in the airplane's hydraulic architecture and has a cost in terms of additional on-board weight.

Finally, document WO 2007/048164 A1 describes an electromagnetic device that can function both as motor and generator located in the rim of at least one wheel of at least one main landing gear, which allows both the taxiing and braking functions to be performed, replacing the carbon brakes which now occupy this space in the main landing gear wheel rims. At this time, this type of system is proving to be too heavy and bulky to be advantageously mounted on airplanes.

The disclosed embodiments aim to provide an autonomous taxiing system for commercial airplanes, which can be housed close to one or more nose or main landing gears, and which is simpler and lighter than existing solutions, such that the airplane can move on the ground between the terminal and the take-off or landing runway without using its main engines or any runway equipment while consuming little fuel in these taxiing phases and without adding significant additional consumption in flight phases.

To achieve this, the disclosed embodiments provide a device for driving at least one wheel of an aircraft landing gear that comprises at least one turbine machine incorporated at the landing gear level of the aircraft.

Preferably, the turbine machine comprises an axial turbine stage driving an output shaft through a reducer/inverter consisting of one or more planetary gear trains.

Advantageously, the turbine machine comprises a freewheel device.

According to one particular embodiment, the turbine machine is a pneumatic turbine.

In this context, according to a first variant, the drive device comprises a pneumatic system for supplying the turbine, taking its air from the airplane's pneumatic circuit. Notably in this case, the link can be realized by tapping into the network that links the auxiliary power unit to the aircraft's air conditioning systems, upstream from these air conditioning systems.

According to a second variant, the drive device comprises a pneumatic system for supplying the turbine, taking its air from a compressor's pneumatic circuit.

Advantageously, the pneumatic supply system is adapted to the landing gear operating mechanism and comprises, to achieve this, articulated and/or telescopic means.

The device advantageously comprises a valve to control and shut off the air intake on the pneumatic supply system.

According to a preferred embodiment, the device comprises an air management system located by a compressor or by the control and shut-off valve, designed to control the air flow and rotation speed of the turbine and thus the speed of the wheel or wheels and directly controlled by the crew from the cockpit using a suitable control means such as a mini-joystick.

BRIEF DESCRIPTION OF THE DRAWINGS

Other features and advantages of the disclosed embodiments will become apparent in reading the following description of a non-limiting example of realization of the disclosed embodiments with reference to the drawings, which show.

DETAILED DESCRIPTION

As seen previously, the disclosed embodiments consist of incorporating on one or more parts of the airplane's nose or main landing gear one or more turbine machines 1.

The turbine machines 1 are pneumatic turbines that are part of a pneumatic drive system for one or several wheels 22 of a landing gear 19.

The pneumatic device consists, in a non-exhaustive manner, of a pneumatic supply system 2 and a pneumatic turbine.

Figure 1:
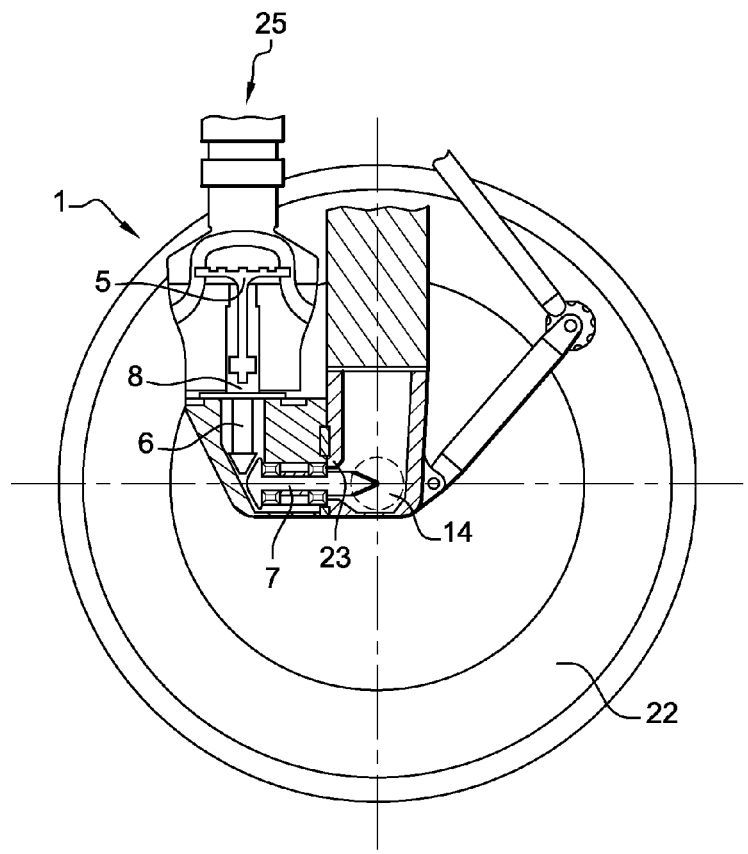
in FIG. 1: a half-section side view of an example of realization of a device according to the disclosed embodiments.

The pneumatic turbine shown in FIG. 1 comprises a pressurized air inlet 25 supplying an axial turbine stage 5 driving an output shaft 7.

The output shaft ends here by a bevel gear that drives the wheel shaft 14 shown in dotted lines in FIG. 1.

To adjust the speed of rotation of the wheel and allow operation in reverse, a reducer/inverter 6 consisting of one or several planetary gear trains or any other suitable means of reduction is provided between the turbine and the wheel axle.

The device comprises preferably a freewheel system 8 designed to disconnect the turbine from the wheel.

The supply system of this air turbine comprises a pressurized air line 2 connecting a pressure source to the turbine and comprises an air inlet control and shut-off valve 3 in a pressurized part of the air line.

In the case of an architecture in which the auxiliary power unit 9, commonly called APU, does not provide air under pressure and in which an electric compressor supplies the air conditioning system on the ground, the most suitable place for the turbine supply is the compressor output.

Figure 5:
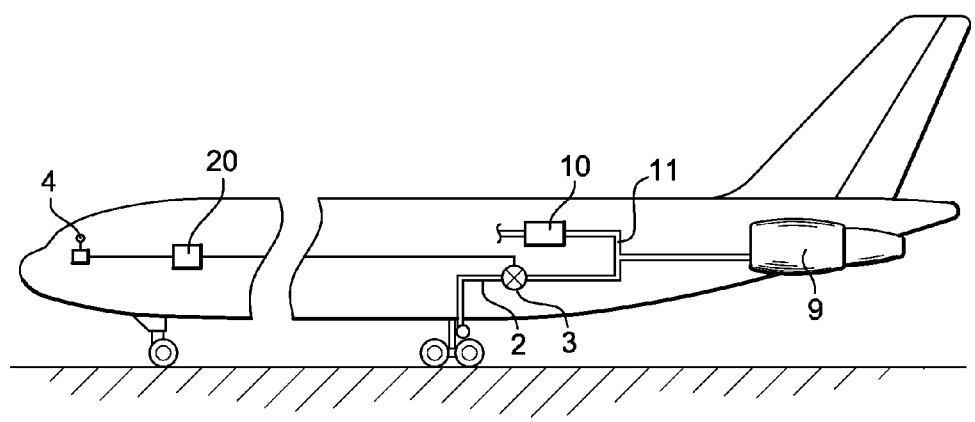

FIG. 5 shows the case of an architecture for which the auxiliary power unit APU system supplies pressurized air to the air conditioning systems 10. In this case, the link is advantageously realized by a tap into the network 11 connecting the APU 9 to the air conditioning systems 10.

In such a case, it is also possible to consider using a specific compressor to power the air turbine or turbines.

The device also advantageously comprises an air management system located by the compressor or by the shut-off valve 3 to control the air flow and speed of the turbine and thus the speed of the controlled wheel or wheels.

The air supply 2 consists of a network of pneumatic pipes designed to connect a source of compressed air to the turbine in question.

Figure 2:
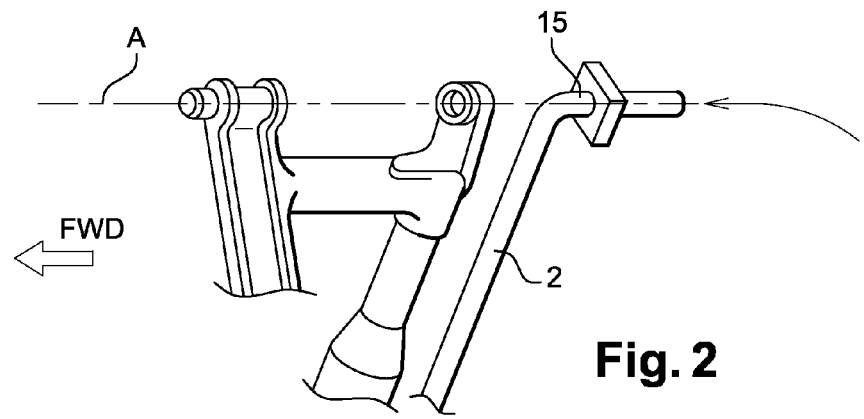
in FIG. 2: a view of a detail of a nose gear representing supply means for the device of FIG. 1.

The network is adapted to the landing gear operating mechanism and notably FIG. 2 shows the positioning of a mobile elbow 15, allowing rotation and ensuring the supply of pressurized air in deployed mode, located in the "A" axis of rotation of the landing gear.

Figure 3:
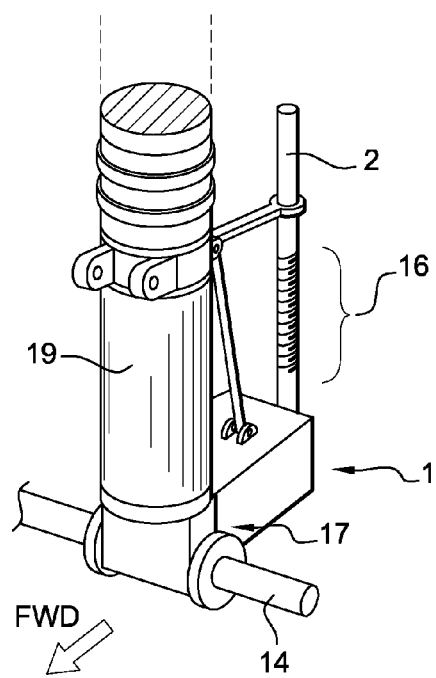
in FIG. 3: a view of a siting detail of a second example of the device according to the disclosed embodiments.
Figure 4:
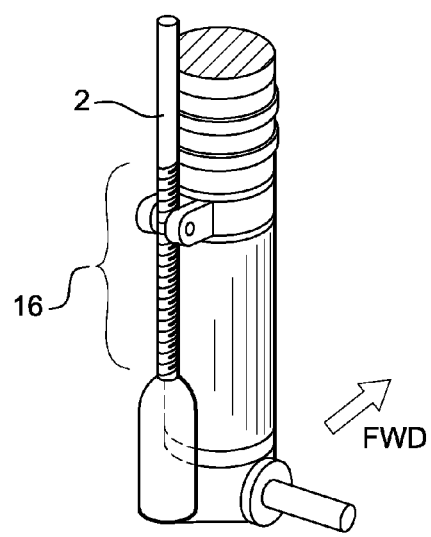
in FIG. 4: a view of a siting detail of a third example of the device according to the disclosed embodiments; and in FIG. 5: an architecture for which an auxiliary power unit APU system supplies pressurized air to air conditioning systems.

In FIG. 3, showing the landing gear strut 19, the supply manifold 2 and a turbine 1 arranged behind the landing gear strut 19 coupled to a shaft 14 common to two wheels, a telescopic tube device 16 allows the movements of the landing gear strut suspension to be compensated for.

The startup of the system is directly controlled by the crew from the cockpit. In practice, the crew sends an electrical signal to the main controller 20 located in the airplane's electrical power center by pressing a button. The main controller converts the electrical signal into a logic signal sent to the pressurized air inlet shut-off valve 3. The opening of the valve then enables the air supply to the air turbine and, if necessary for extra power, the airplane's electrical power center orders the supply to the air conditioning devices to be cut off.

During the phases of low-speed forward taxiing, between the terminal and the runway, the airplane's speed is directly controlled by the crew from the cockpit through a suitable control means 4, such as an electrical mini-joystick, that sends a control signal to the plane's electrical power center.

This last relays the signal to the air intake management system controlling the air pressure at the turbine inlet. The speed of rotation of the turbine and therefore the speed of rotation of the output shaft 7 depend on this pressure. This shaft drives the rotation of one or more wheels of the landing gear on which this air turbine is mounted. Thus, the crew directly controls the taxiing speed of the airplane from the cockpit by controlling the air pressure.

During the taxiing phase, the control of the aircraft in phases of cornering on the ground is similar to that used today. An electrical signal is sent from the cockpit to the airplane's electrical controller, which transmits the information to the nose gear steering control.

There may be only one system, i.e. mounted on a single landing gear, driving one or more wheels of this landing gear or multiple systems, i.e. consisting of several turbines each mounted on a different landing gear, or comprising several turbines on a single landing gear.

The multiple system allows the taxiing function to be performed even in case of failure of one of the turbines and the ability to guide the aircraft to be improved using a differential speed control on the drive wheels.

During the high-speed phases (takeoff and landing), the airplane is propelled by its main engines; the turbine is then disengaged from the wheel axles using the freewheel system 8 and the system is no longer supplied with air.

A system for inverting the direction of rotation is advantageously incorporated into the air turbine device. To ease maintenance, the air turbine device must be easily removable. To achieve this, an easy-mount interface system is fitted between the device according to the disclosed embodiments and the landing gear.

This system 23 is for example identical to the known systems used to attach the air starter of the airplane's main engines to the accessory box of said engines.

It will also be possible for an airplane fitted with a landing gear adapted to the device according to the disclosed embodiments, but whose turbine and/or pneumatic network has been previously disassembled, to taxi and fly, the airplane remaining usable even if the device according to the disclosed embodiments is being repaired in a workshop.

Since the main engines are not operating during the taxiing phase, the total fuel consumption for any given mission decreases sharply if the disclosed embodiments are adopted. Similarly, global and local emissions are greatly reduced, as is the noise level.

In addition, such a taxiing procedure allows the ingestion of foreign debris by engines, when they are in operation for taxiing, to be avoided.

The device according to the disclosed embodiments allows the airplane to move autonomously on the ground, without the help of runway tractors, allowing time savings and operating costs reductions.

Unlike an electric or hydraulic motor, the device according to the disclosed embodiments does not require extensive changes to the architecture of the airplane. Only one pressurized air line must be added per air turbine.

In addition, the total weight of this device is reduced compared to the other proposed solutions.

The invention claimed is:

1. A device for driving at least one wheel of a landing gear of an aircraft, comprising:
    at least one turbine machine incorporated in the landing gear of the aircraft, the turbine machine comprising:
        a pneumatic turbine comprising an air management system configured to control the air flow and speed of rotation of the turbine, wherein the pneumatic turbine is directly controlled from the cockpit by a control means to control a taxiing speed of the aircraft during forward low-speed taxiing phases, and
    a pneumatic supply system for supplying the pneumatic turbine, wherein air for the pneumatic system is supplied from a pneumatic circuit of the aircraft and wherein the pneumatic supply system comprises an air supply manifold comprising a mobile elbow allowing rotation of the air supply manifold, the mobile elbow being located in line with a rotation axis of the landing gear.

2. The device according to claim 1, wherein
an axial turbine stage driving an output shaft through a reducer/inverter is positioned between the axial turbine stage and the output shaft.

3. The drive device according to claim 2, wherein the reducer/inverter comprises one or more planetary gear trains.

4. The drive device according to claim 1, wherein the control means comprises an electrical mini-joystick configured to send a control signal to an electrical power center configured to relay the control signal to an air intake management system configured to control an air pressure at an inlet of the pneumatic turbine.

5. The device according to claim 1, wherein the turbine machine comprises a freewheel device.

6. The device according to claim 1 comprising a pneumatic supply system for supplying the pneumatic turbine, wherein air for the pneumatic system is supplied from a pneumatic circuit of a compressor.

7. The device according to claim 1, combined with a second device according to claim 1 for driving a second wheel of the aircraft, into a system for taxiing the aircraft, wherein the control means operates to control the speed of each of the one and second wheels of the aircraft using a differential control of the rotation speeds of the turbines of said devices to enhance steering capabilities of the aircraft.

8. The device according to claim 1, wherein the turbine machine comprises an axial turbine stage driving an output shaft which terminates in a bevel gear driving a shaft on which is mounted the aircraft wheel.

9. The device according to claim 1, wherein the pneumatic circuit comprises a network linking a compressor unit to an air conditioning system of the aircraft.

10. The device according to claim 1, wherein the pneumatic supply system comprises an air intake control and shut-off valve.

11. The device according to claim 10, wherein the air management system is proximate a compressor or proximate the air intake control and shut-off valve.

12. The device according to claim 1, wherein the landing gear comprises an operating mechanism including a landing gear strut, and the pneumatic supply system includes a pneumatic supply manifold which is coupled to the landing gear strut and includes a telescopic tube device.

13. The device according to claim 1, combined with a second device comprising:

at least one turbine machine incorporated in the landing gear of the aircraft, the turbine machine comprising:

a pneumatic turbine comprising an air management system configured to control the air flow and speed of rotation of the turbine, wherein the pneumatic turbine is directly controlled from the cockpit by a control means to control a taxiing speed of the aircraft during forward low-speed taxiing phases, and an axial turbine stage driving an output shaft through a reducer/inverter positioned between the axial turbine stage and the output shaft for driving a second wheel of the aircraft, into a system for taxiing the aircraft, wherein the control means operates to control the speed of each of the one and second wheels of the aircraft using a differential control of the rotation speeds of the turbines of said devices to enhance steering capabilities of the aircraft.

14. The device according to claim 1, wherein the control means is configured to send a control signal to an electrical power center configured to relay the control signal to an air intake management system configured to control an air pressure at an inlet of the pneumatic turbine, and including a pneumatic supply system for supplying air to the pneumatic turbine, wherein air for the pneumatic system is supplied from a pneumatic circuit of the aircraft which comprises a network linking a compressor unit to an air conditioning system of the aircraft, and said electrical power center is configured to cut off a supply of air to the air conditioning system from the compressor when the control means is operated to supply air to the pneumatic turbine.

* * * * *